United States Patent [19]

Redmond, Jr.

[11] 4,053,547

[45] Oct. 11, 1977

[54] METHOD FOR PRODUCING A POSITIVE DRIVE BELT

[75] Inventor: John D. Redmond, Jr., Littleton, Colo.

[73] Assignee: The Gates Rubber Company, Denver, Colo.

[21] Appl. No.: 372,124

[22] Filed: June 21, 1973

Related U.S. Application Data

[62] Division of Ser. No. 189,440, Oct. 14, 1971, Pat. No. 3,772,929.

[51] Int. Cl.² ............................................ B29D 29/02
[52] U.S. Cl. .................................... 264/102; 156/137; 156/138; 264/135; 264/229; 264/257; 264/275
[58] Field of Search ............... 264/102, 229, 275, 277, 264/257; 156/137, 138

[56] References Cited

U.S. PATENT DOCUMENTS 3,482,004  12/1969  Andersen .............................. 264/277

FOREIGN PATENT DOCUMENTS 744,907  1956  United Kingdom ................ 264/257

Primary Examiner—Richard R. Kucia
Attorney, Agent, or Firm—Curtis H. Castleman, Jr.; Raymond Fink; H. W. Oberg, Jr.

[57] ABSTRACT

A method for casting cog-type power transmission belts from flowable elastomeric materials including the steps of forming a mold cavity defined by a mold mandrel and an outer mold shell, one of which has a plurality of axially disposed notches; wrapping preferably an extensible fabric about the surface of the notched mold portion; placing preferably fibrous loading members on the extensible fabric and superimposed over the axial notches; forcing the fibrous loading members and extensible fabric into the bottom contour of the notches; and introducing a substantial liquid elastomeric material into the mold cavity and polymerizing the elastomeric form in the mold to produce a sleeve containing one or more unitary endless cog-type belts.

19 Claims, 5 Drawing Figures

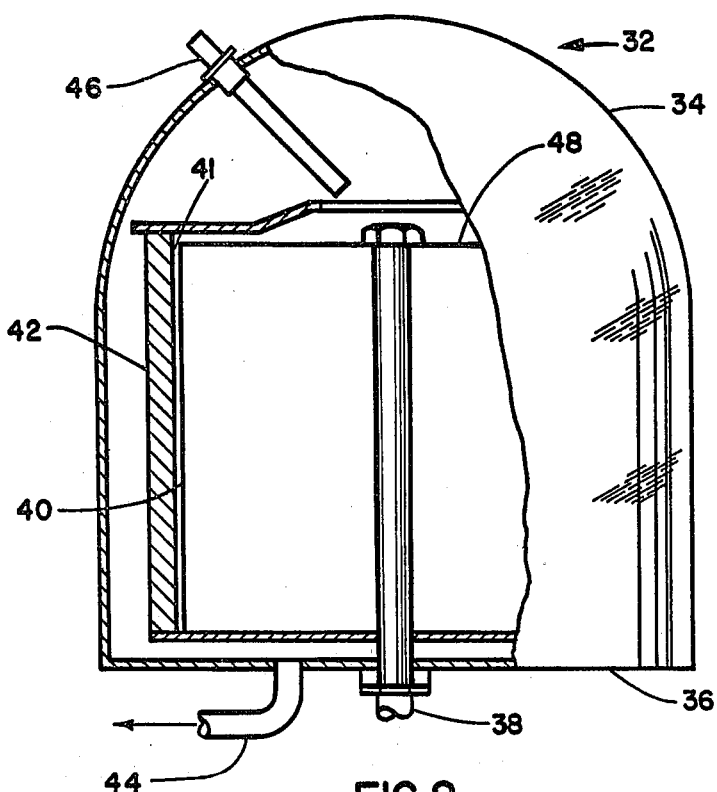
FIG. 2
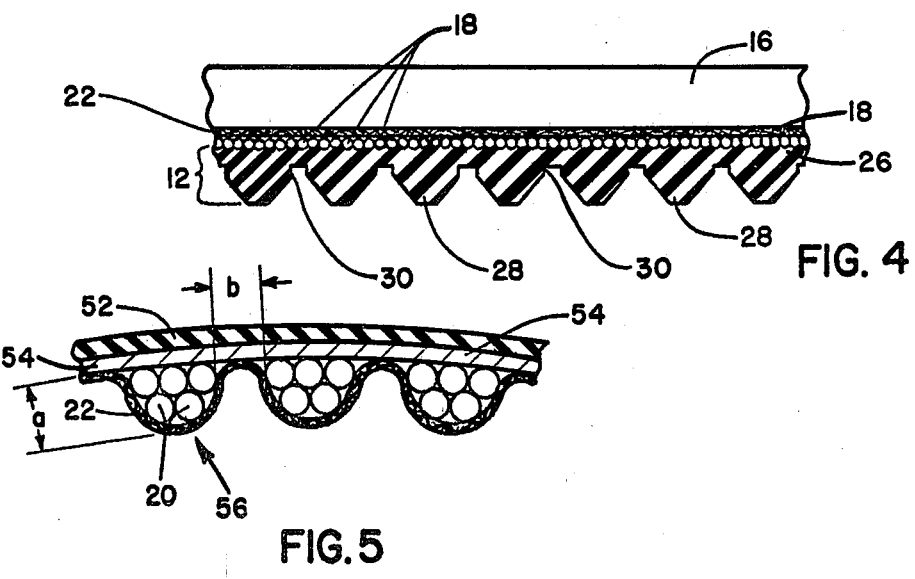
FIG. 4
FIG. 5

METHOD FOR PRODUCING A POSITIVE DRIVE BELT

This is a division of application Ser. No. 189,440, filed Oct. 14, 1971.

BACKGROUND OF THE INVENTION

This invention relates to endless belts of the cog type containing a shear, abrasion and noise resistant cover element in combination with a transverse positioning member contained within the body portion of the cogs, and further relates to a method for producing such belts.

Positive drive or synchronous drive rubber transmission belts customarily are provided with an abrasion resistant or shear resistant fabric covering on the cog teeth, such as shown in U.S. Pat. No. 2,507,852. The methods for positioning the fabric along the tooth face have generally required special equipment or handling. With the protective fabric covering, the belt has an increased load life, although the cogs oftentimes do not possess the necessary shear resistance for prolonged life desired in many applications. A further drawback with prior art belts has been the lack of any suitable means, e.g., a transverse cog member, for proper alignment and support of the tensile members during operation of the belt. Without the provision of such a structural supporting means, the tensile members have had the tendency to displace non-uniformly in some instances so that the resultant relative position of the tensile members in the overcord is not exactly maintained.

It has been recognized that power transmission belts constructed of a castable elastomer, e.g., liquid polyurethane, offer a number of significant advantages over conventional rubber belting. Among these advantages are that the liquid cast belt is less susceptible to flex fatigue, may be driven around smaller sheaves, and has overall improved load life. These cast belts may also be vacuum spin cast in a single operation as contrasted to the numerous steps required to build a conventional rubber tooth-type belt. To the best knowledge of applicant, no cast elastomer cog-type belt has been produced commerically which includes the protective fabric covering about the teeth or cogs of the belt, due apparently to the lack of an economical method of applying such a fabric layer. Without such a layer, the cogs of the belt are susceptible to damaging shearing forces, and, because of the exposure of polyurethane or other elastomer to sheave surfaces, noticeable and objectionable noise is produced.

Typical prior art references relating to the general field of the present invention include U.S. Pat. Nos. 1,890,080 (Freedlander), 2,507,852 (Case), 2,514,429 (Waugh), 3,078,206 (Skura), 3,138,962 (Haines et al), 3,200,180 (Russ et al) and 3,580,767 (Barnes et al).

It is a primary object of the present invention to overcome the drawbacks of the prior art and provide a power transmission belt of the direct or synchronous drive type having improved load life and composed of a rubber-like castable or non-castable material.

It is a further object of the invention to provide a method for producing a liquid castable cog-type transmission belt having in combination a transverse member in the cog, and a wear resistant fabric layer substantially at the surface of the cog.

It is still another object to have such a transverse cog member in combination with an outer fabric layer as utilized in a cast polyurethane belt.

SUMMARY OF THE INVENTION

Briefly described, in one aspect of the invention, an endless belt is provided having an elastomeric body portion with longitudinal tensile members embedded in the overcord of the body, and a plurality of spaced cogs intimately bonded with the overcord and containing transverse members embedded within the cog and in close proximity to the tensile members. The inner circumferential face of the belt formed by alternating cog and land portions carries a layer of reinforcing fabric intimately bonded to the elastomeric body section. As a modification of the aforementioned structure, the overcord portion of the belt opposite the inner facial cog portions may be provided with one or more load transmitting elements, e.g. circumferentially extending V- or trapezoidal elements.

In another aspect of the invention, a method for casting cog-type power transmission belts from flowable elastomeric materials is described, including the steps of: (1) forming a mold cavity defined by a mold mandrel and an outer mold shell, one of which has a plurality of axial notches; (2) wrapping an extensible fabric about the surface of the notched mold portion; (3) placing preferably fibrous loading members upon the extensible fabric and superimposed over the axial notches; and (4) forcing the fibrous loading members and extensible fabric into the bottom contour of the notches; and (5) introducing a substantially liquid elastomeric material into the mold cavity and polymerizing the elastomeric form in the mold to produce a sleeve containing one or more unitary endless cog-type belts.

BRIEF DESCRIPTION OF THE DRAWINGS

The invention will be more readily understood by reference to the accompanying drawings, in which like numerals designate like parts in the several figures, and wherein:

FIG. 2 is one type of casting assembly for carrying out the method of casting according to the invention;

FIG. 4 is a cross-sectional view taken along a land portion of a belt sleeve made in the apparatus shown in FIG. 3.

FIG. 5 is a cross-sectional fragmentary view of another embodiment of the invention.

PREFERRED EMBODIMENTS OF THE INVENTION

Figure 1:
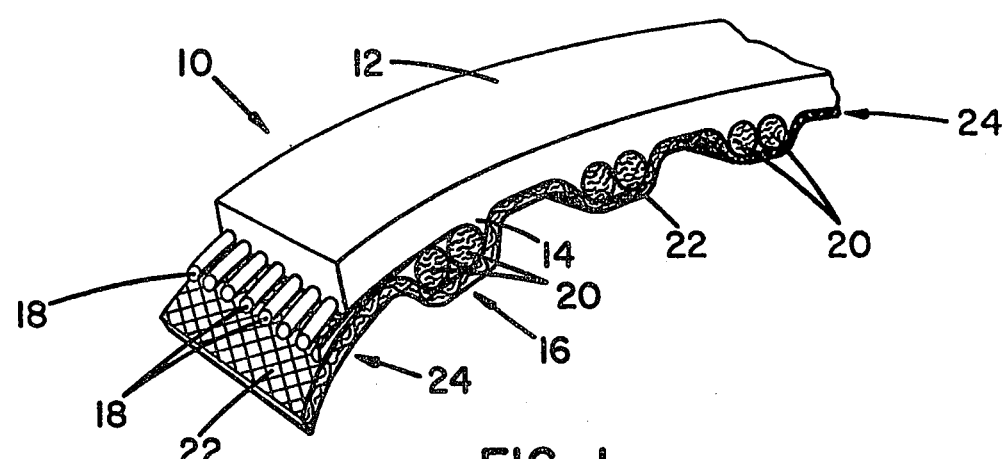
FIG. 1 is a fragmentary, perspective view of one preferred power transmission belt made according to the invention.

Referring to FIG. 1 an endless cog-type belt is shown. The belt consists of an overcord section 12 of an elastomeric material and a series of spaced cogs or teeth 16, also containing an elastomeric material 14. The elastomeric material utilized in the overcord 12 and tooth body 14 are compatible and may be of the same of different type elastomer. Preferred elastomers include rubber-like materials, generally encompassing natural or synthetic rubbers or rubber-like compounds. Examples of suitable synthetic srubbers include such materials as styrene-butadiene, butadiene-acrylic, nitrile copolymers, polychloroprenes, neoprenes, polyurethanes, polybutadiene, polyisoprene or blends of these materials with each other or with natural rubber. The elastomer overcord 12 is preferably loaded with a reinforcing tensile layer or plurality of tensile members such as the longitudinally extending and spaced tensile cords 18. These tensile members 18 may consist of one or more strands of a conventional stress-resistant material such as polyamide cord, fiber glass, polyester cord or wire filaments. The tensile members may be prestressed or impregnated with a suitable material if desired.

According to the invention, the cogs or teeth 16 of the belt take on a particular configuration. Specifically, the teeth are characterized by containing one or more embedded transverse members 20 and in combination therewith, an inner-peripheral contour-following fabric layer 22.

The reinforcing fabric 22 intimately fits along the inner-periphery of the belt forming a face cover for the cog teeth 16 and alternating land portions 24. This fabric may be of a conventional weave, consisting of warp and weft threads at any desired angle, or may consist of warp threads held together by spaced pic cords among other configurations. If desired, the fabric may be cut on a bias as shown. Conventional fabrics may be employed, such as cotton, polyester, polyamide, hemp, jute and various other natural and synthetic fibers. The fabric may be rubberized if desired. In a preferred embodiment of the invention, when utilizing a liquid castable elastomer such as polyurethane, the fabric layer 22 preferably consists of an expansible wear-resistant fabric such as nylon. When utilizing readily flowable elastomers such as polyurethane, the fabric layer 22 will usually be impregnated with the elastomer and have an outer skim-coating of the elastomer which forms the inner face of the belt (not shown).

The wear-resistant layer 22 performs a number of functions, including providing the cogs 16 with a resistance to shear and abrasive forces commonly encountered, and forms a protective layer shielding both the tensile members 18 along the land portions 24 of the inner face of the belt as well as protecting the transverse cog members 20 from exposure to shear and abrasion. With respect to elastomers which have a tendency to generate noise when the cogs of the belt engage the cooperating gear teeth of a sheave, e.g. some urethane polymers, the resistant fabric layer 22 operates to isolate the elastomer body, such as portion 14 from direct contact with the sheaves. While urethane elastomers offer a number of advantages over conventional elastomers in positive drive belts, the noise generation exhibited by urethane belts has presented a significant objection to their use heretofore.

The transverse members 20 embedded in the cogs perform a number of important functions. In one aspect, these transverse members increase the shear strength of the cogs and tend to dampen noise produced when the cogs strike the cooperating gear teeth surfaces of the driving and driven sprockets or sheaves. It is preferred that this transverse member substantially fill the cog portion vertically, so as to come into contact or in close proximity to both the fabric member 22 and tensile section 18. Such positioning provides a reinforcement or support for the fabric layer 22 and maintains the tensile section 18 in relative alignment, e.g. substantially preventing the individual tensile cord members 18 from being displaced with respect to each other. The transverse members 20 additionally lend transverse rigidity to the belt, inhibiting undesirable waves or undulations along the face of the belt during operation. The transverse members also help position the fabric layer down in the grooves of the mandrel during the building process. In general, the belt may be built up on a conventional drum, and subjected to transfer, compression, injection or other type of molding or casting operation. In a preferred form of the invention, when utilizing a flowable elastomer, the transverse members 20 serve the very important aforementioned function of positioning the fabric along the intercontour of the belt during casting.

The transverse member 20 may consist of one or more members extending generally transverse to the direction of rotation of the belt. The transverse members may be formed of any suitable elongated member of any suitable cross-sectional shape preferably acting to reinforce the cog. Examples of suitable materials include polyesters, cellulosic materials such as rayon, and cotton, polyamides such as nylon, hard rubbers, wire, or fiber glass, or other materials present in various configurations exemplified by cords, filaments, twisted strands rope, tubes, braided fibers, rods, etc. If the cross member 20 is not naturally adherent to the elastomeric body 14 and 12, the cross member 20 may be suitably impregnated with a composition which will effect the necessary adherence.

A modification of the belt of FIG. 1 is shown in FIG. 5 in cross-section taken along the direction of travel of the belt. The belt consists of the usual elastomeric overcord section 52 containing a circumferentially extending tensile layer 54. The undercord of the belt carries a plurality of spaced teeth or cogs 56, which, according to the invention, have an outer wear and abrasion resistant fabric outer layer 22 and a plurality of transverse members 20. These transverse members fill a major proportion of the cogs 56 and particularly the vertical distance "$a$" between the tensile member an innermost portion of the cogs. This gun belt configuration has a deep notch between cogs, and preferably the ratio of $a:b$, $b$ being the distance between adjacent cogs measured at their respective bases, is at least about 1.0:1, and more preferably at least 1.4:1. This belt has a high load carrying capacity and in many instances may transmit power previously restricted to chain type drives.

The elastomeric overcord layer 12 (or 52)of the belt may carry positive drive elements such as cogs or teeth of various shapes, or alternatively may carry a power transmitting portion, such as one or more V-sections. The latter configuration is shown in FIG. 4 of the drawings, a view looking along the direction of travel of the belt and taken sectionally along one of the land portions between successive cogs 16. The side of the belt opposite the tooth portion 16 comprises a plurality of spaced longitudinally extending V-elements tied together by a common elastomeric tie-band section 26, containing circumferentially extending tensile cord 18. Additional tensile layers or additional transverse reinforcing layers may be utilized in the multipe V and/or tie-band sections for increased rigidity and resistance to elongation and deformation. Between the V or trapezoidal elements 28 there is preferably a vertical flat portion 30 in order to provide the necessary degree of clearance between the land of the sheave and the bottom of the tie-band 26 during belt operation so that the modulus of the tie-band alone is not depended upon to provide relative freedom between the V-portions 28 to accommodate inaccuracies of the sheave. Furthermore, this clearance provide by the vertical flat portion allows foreign elements such as rocks and cinders to lodge themselves between the land of the sheave and the bottom of the tie-band, and prevent disengagement of the belt during operation. Furthermore, this vertical clearance 30 allows the individual V-portions 28 to accommodate their own wedging action in the individual grooves of the sheaves with which they co-act, increasing power transmission capability.

A preferred general technique for producing belts of the aforementioned type, and particularly directed to producing such belts cast from liquid elastomers, is described in U.S. Pat. No. 3,138,962 (Haines, et al) and 3,200,180 (Russ, et al). Accordingly, as is shown in FIG. 2, a casting assembly 32 broadly comprises an outer vacuum chamber 34, a platform 36 upon which the vacuum chamber rests, a central rotatable shaft 38 extending from the outside of the vacuum chamber through the platform into the chamber upon which is supported an interior mandrel 40, and an outer-spaced concentric mold shell 42. The vacuum chamber 34 may be evacuated by an exhaust line 44, which is connected to a vacuum pump (not shown). The liquid casting material is introduced by means of an entry port 46 which is directed toward the top of a distributing plate 48. As the assembly is rotated, the liquid elastomer is force to the outer regions by means of centrifugal force an by means of a baffle system and guide system incorporated as part of the distributing plate 48. On the outer region of the plate, the material is then directing to the cavity 41 bounded by the central mandrel 40 and the outer mold shell 42.

This type of centrifugal casting lends itself to a number of modifications. Thus, a laminated belt structure having different density materials may be manufactured by metering together two or more components having different specific gravities and utilizing the centrifugal force created by the rotating mandrel to separate the components, the heavier gravity component being forced to the outer part of the mold, and the lighter gravity component forced toward the center of the mold, etc. Furthermore, one could partially fill the outer extremity of the mold volume with one component followed by a partial curing step, and further followed by metering in a different component to form the inner portion of the mold and curing.

Various types of materials are available which may be cast. Examples are curable liquid elastomers exemplified by plastisols, organosols, liquid chloroprenes, liquid polysulfides, liquid rubbers, silicones, epozides urethanes, carboxylated butadiene-acrylonitrile, polyester based resins, polyether based resins, together with others. Polyurethane elastomers are generally preferred at present because of their tensile strength, abrasion resistance and satisfactory modulous and elasticity character. In a conventional manner, a polyurethane prepolymer (formed by reaction of an active hydrogen-containing compound with a polyisocyanate) having a certain free NCO content is compounded with a curing agent and an amount of plasticizer or other ingredient, if desired, and introduced into the mold cavity.

Conventional curing agents may be utilized, such as organo nitrogen-containing compounds exemplified by substituted aromatic amines.

Figure 3:
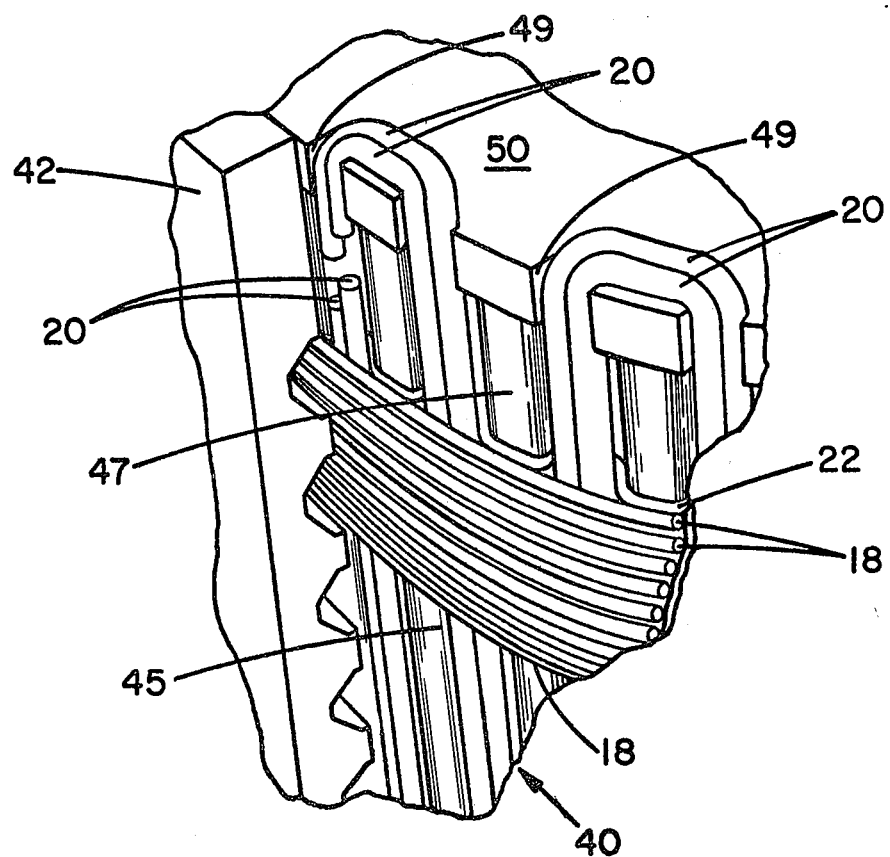
FIG. 3 is a fragmentary, perspective view of a molding apparatus for producing a combination cog and multiple V power transmission belt according to the invention.

Referring particularly to FIG. 3, there is shown a mold cavity for casting a belt of the type shown in cross-section in FIG. 4. A trapezoidally-notched mold shell 42 concentrically surrounds an inwardly disposed mandrel 40 having spaced axially extending notches 45 and laternating upstanding portions 47. At the top and bottom of the mandrel are a pair of end cap closures 50 having a plurality of notches 49 lining up with the mandrel notches 45.

According to a preferred embodiment of the method of present invention, the notched end caps 50 are placed in position and a layer of fabric 22 is wrapped about the lubricated mandrel 40. This fabric is preferably of an extensible nature, allowing it to be readily stretched and conformed to the mandrel notches 45. The transverse member 20 are then woven in an up-and-down manner through adjacent notches of one end cap and then through alternate notches of the opposite end cap, until the entire mandrel is woven. In the succeeding step, the tensile member 18 is spirally wound about the circumference of the mandrel and under such tension as to force the transverse members 20 against the fabric layer 22, forcing the latter into conformity with the notches 45 of the mandrel. Preferably, the geometry of the mandrel notches 45 is chosen to accommodate substantially the entire cross-section of the transverse cog members(s) 20.

Once the tensile members 18 have been wrapped about the mandrel, the transverse member 20 may be cut at a point just below the end caps, and the resultant wrapped mandrel placed in a mold of the type shown in FIG. 2, for instance, ready for the casting operation. Centrifugal casting combined with applied vacuum may be employed for good results. Such a casting method is described in the above-mentioned Haines et al and Russ et al patents.

After polymerization has taken place and sufficient cure time allowed, the mold may be disassembled and the resultant sleeve of belts cut into individual belts of desired width. A skiving operation may be employed to give the desired final configuration to the teeth and/or trapezoidal element portions. Thus, skiving could provide the sole method for notching the overcord (opposite the cog side) into desired V-forms, if desired.

It should be understood that the invention is capable of a variety of modifications and variations which will become apparent to those skilled in the art upon a reading of this specification. Such modifications and variations and equivalents are intended to become a portion of the invention and fall within the scope of the appended claims. For instance, while the method of the present invention has been directed primarily to casting of liquid elastomeric materials utilizing a notched mold mandrel and an outer mold sleeve, the parts could be reversed so as to mold the belt in the reverse manner and then subsequently flip the belt to achieve the desired orientation. Furthermore, the particular method of weaving the transverse positioning members about the ends caps for positioning the fabric layer 22 at the inner surface of the belt is merely illustrative of a number of suitable methods for accomplishing the same result, and is not meant to limit the invention to such disclosed method.

What is claimed is:

1. A method for casting cog-type power transmission belts from flowable elastomeric material comprising the steps of:
   a. forming a mold cavity defined by a mold mandrel and an outer mold shell, one of said mandrel or shell having a plurality of notches therein disposed substantially parallel to the axis of the mold;
   b. wrapping an extensible fabric about the surface of the notched mold portion;

c. placing loading members upon the extensible fabric and positioned opposite of and extending in the same direction as said notches;
d. forcing said loading members and the extensible fabric ahead of the loading into the bottom members of said notches;
e. introducing a substantially liquid elastomeric material into said mold cavity; and
f. polymerizing the resultant formed product to form one or more unitary endless belt members.

2. The method of claim 1 wherein said mold cavity is defined by an axially notched mold mandrel and an outer mold shell.

3. The method of claim 2 wherein the loading members and extensible fabric are forced into said notches of the mandrel by winding under tension a fibrous tensile layer about the mandrel and on top of and transverse to said loading members.

4. The method of claim 3 wherein the fibrous tensile layer comprises a cord sprially wound in a plurality of coils about the mandrel.

5. The method of claim 1 wherein said flowable elastomeric material is selected from the group consisting of plastisols, organosols, liquid chloroprene, liquid polysulfide, liqid rubbers, silicones, epoxides, carboxylated butadieneacrylonitrile, polyester based resins and polyether based resins.

6. The method of claim 1 wherein said flowable elastomeric material is polyurethane.

7. The method of claim 1 wherein the mold is made to rotate about an axis of rotation as the elastomer is introduced.

8. The method of claim 7 wherein a vucuum is applied to the mold cavity during rotation of the mold until the elastomer is fully introduced.

9. The method of claim 1 wherein said loading members are in the configuration of cords.

10. The method of claim 1 wherein said loading members are in the configuration of filaments.

11. The method of claim 1 wherein said loading members are in the configuration of twisted strands.

12. The method of claim 1 wherein said loading members are in the configuration of ropes.

13. The method of claim 1 wherein said loading members are in the configuration of tubes.

14. The method of claim 1 wherein said loading members are in the configuration of braided fibers.

15. The method of claim 1 wherein said loading members are in the configuration of rods.

16. The method of claim 1 wherein prior to introduction of said liquid elastomeric material into the mold cavity the following additional step in employed:
impregnating said loading members with a composition which effects adherence between the loading member and elastomeric material.

17. A method for casting positive drive power transmission belting from flowable elastomeric material comprising the steps of:
forming a mold cavity defined by a mold mandrel and an outer mold shell, one of said mandrel or shell having a plurality of notches therein disposed substantially parallel to the axis of the mold;
wrapping a fabric about the surface of the notched mold portion;
locating loading members upon the fabric and positioned opposite of and extending in the same direction as said notches;
wrapping a fibrous tensile layer upon the loading members and in a direction transverse to said loading members in a manner to force said loading members and the fabric ahead of the loading members into conformance with the bottom of the notches;
said transverse members filling a major proportion of the distance between the fibrous tensile layer and the bottom of said notches;
introducing a substantially liquid elastomeric material into said mold cavity; and
polymerizing the resultant formed product to form a sleeve of belting from which one or more unitary endless belt members of the positive drive type may be severed.

18. The method of claim 17 wherein said loading members are in the configuration of cords.

19. The method of claim 18 wherein said notches accommodate substantially the entire cross-section of the cord members.

* * * * *

UNITED STATES PATENT OFFICE
CERTIFICATE OF CORRECTION

PATENT NO. : 4,053,547
DATED : John D. Redmond, Jr.
INVENTOR(S) : October 11, 1977

It is certified that error appears in the above-identified patent and that said Letters Patent are hereby corrected as shown below:

Column 7, line 5, after "loading" insert -- members -- after "bottom" insert -- contour --. Line 5 and 6 delete "members."

Signed and Sealed this

Twenty-eighth Day of March 1978

[SEAL]

Attest:

RUTH C. MASON
Attesting Officer

LUTRELLE F. PARKER
Acting Commissioner of Patents and Trademarks